(12) United States Patent
Dinerman et al.

(10) Patent No.: US 10,197,186 B2
(45) Date of Patent: Feb. 5, 2019

(54) TWO-STAGE SOLENOID VALVE

(71) Applicant: Robert Bosch GmbH, Stuttgart (DE)

(72) Inventors: Michael Dinerman, Heilbronn (DE); Julia Jeschke, Abstatt (DE); Volker Edelmann, Buchen (DE); Dirk Foerch, Neuenstadt/Stein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/024,148

(22) PCT Filed: Sep. 15, 2014

(86) PCT No.: PCT/EP2014/069612
§ 371 (c)(1),
(2) Date: Mar. 23, 2016

(87) PCT Pub. No.: WO2015/039988
PCT Pub. Date: Mar. 26, 2015

(65) Prior Publication Data
US 2016/0245427 A1 Aug. 25, 2016

(30) Foreign Application Priority Data

Sep. 23, 2013 (DE) .................. 10 2013 219 051
Nov. 13, 2013 (DE) .................. 10 2013 223 103

(51) Int. Cl.
*F16K 39/02* (2006.01)
*F16K 31/40* (2006.01)
(Continued)

(52) U.S. Cl.
CPC ............ *F16K 39/024* (2013.01); *B60T 8/363* (2013.01); *F16K 31/0655* (2013.01);
(Continued)

(58) Field of Classification Search
CPC .. F16K 39/024; F16K 31/408; F16K 31/0655; F16K 31/0665; B60T 8/363; Y10T 137/88022; Y10T 137/87507
(Continued)

(56) References Cited

U.S. PATENT DOCUMENTS 1,707,541 A 4/1929 Roth
4,024,884 A 5/1977 Prescott et al.
(Continued)

FOREIGN PATENT DOCUMENTS

DE 195 30 899 A1 2/1997
DE 10 2008 006 380 A1 7/2009
(Continued)

OTHER PUBLICATIONS

International Search Report corresponding to PCT Application No. PCT/EP2014/069612, dated Jan. 7, 2015 (German and English language document) (7 pages).

*Primary Examiner* — John Bastianelli
(74) *Attorney, Agent, or Firm* — Maginot, Moore & Beck LLP (57) ABSTRACT

A valve for controlling fluids, in particular hydraulic fluid, includes a first connector opening and a second connector opening, a preliminary stage with a first valve seat and a first displaceable closing body, and a main stage with a second valve seat and a second displaceable closing body. The first valve seat is assigned to a through opening of the second closing body. A filtering gap is formed in a flow path from the first connector opening to the preliminary stage by way of a constriction of the flow path.

7 Claims, 5 Drawing Sheets

(51) Int. Cl.
*F16K 31/06* (2006.01)
*B60T 8/36* (2006.01)

(52) U.S. Cl.
CPC ..... *F16K 31/408* (2013.01); *Y10T 137/87507* (2015.04); *Y10T 137/88022* (2015.04)

(58) Field of Classification Search
USPC ... 251/129.07, 129.15, 129.19, 30.03–30.04; 303/119.2; 137/601.14, 614.16
See application file for complete search history.

(56) References Cited

U.S. PATENT DOCUMENTS

| | | | | |
|---|---|---|---|---|
| 5,735,582 | A * | 4/1998 | Eith | B60T 8/363 251/30.04 |
| 5,810,330 | A | 9/1998 | Eith et al. | |
| 5,865,213 | A * | 2/1999 | Scheffel | B60T 8/363 303/119.2 |
| 6,435,210 | B1 * | 8/2002 | Obersteiner | B60T 8/363 251/30.03 |
| 6,755,390 | B2 * | 6/2004 | Masuda | B60T 8/363 251/129.19 |
| 7,866,625 | B2 * | 1/2011 | Lee | B60T 8/363 251/30.04 |
| 8,281,802 | B2 * | 10/2012 | Lee | B60T 8/363 251/30.04 |
| 9,038,984 | B2 * | 5/2015 | Voss | B60T 8/363 251/30.04 |
| 2012/0326065 | A1 * | 12/2012 | Ferguson | B60T 8/363 251/129.15 |

FOREIGN PATENT DOCUMENTS

| | | |
|---|---|---|
| EP | 0 262 382 A1 | 4/1988 |
| EP | 2 492 559 A1 | 8/2012 |
| GB | 2 135 755 A | 9/1984 |
| GB | 2 145 500 A | 3/1985 |
| NL | 100230 | 12/1961 |
| WO | 2009/006684 A1 | 1/2009 |
| WO | WO 2012/159908 * | 11/2012 |

* cited by examiner

Fig. 1

PRIOR ART

TWO-STAGE SOLENOID VALVE

This application is a 35 U.S.C. § 371 National Stage Application of PCT/EP2014/069612, filed on Sep. 15, 2014, which claims the benefit of priority to Serial Nos. DE 10 2013 219 051.4, filed on Sep. 23, 2013 and DE 10 2013 223 103.2, filed on Nov. 13, 2013 in Germany, the disclosures of which are incorporated herein by reference in their entirety.

BACKGROUND

The disclosure concerns a valve, in particular a solenoid valve, for controlling fluids, in particular hydraulic fluid, having a first port and a second port, a preliminary stage with a first valve seat and a first displaceable closing body, and a main stage with a second valve seat and a second displaceable closing body, wherein the second closing body has a passage opening to which the first valve seat is assigned.

Valves of the type cited initially are known from the prior art. In automobile construction, such valves are used for example in hydraulic brake systems in order to control the inlet or outlet of gasses or fluids, in particular brake fluid, or in order to control and regulate the flow direction. Widely varying systems are known from the field of vehicle brake systems, in which an active or partially active pressure build-up is achieved via a two-stage valve which has a preliminary or a main stage. Frequently, the valve is provided as a high-pressure switching valve, activation or operation of which opens a flow path between a master brake cylinder (primary circuit) and a pump element (secondary circuit). The two-stage configuration allows opening of the valve or clearance of the flow path even at high differential pressures. The primary circuit is connected to the first port and the secondary circuit to the second port, between which the two closing bodies are located. Usually a filter, in particular a radial filter, is assigned to the first port and serves to retain larger dirt particles which should not enter the primary circuit. When, because of the pressure conditions, the flow path extends from the second port to the first port, dirt particles are collected on the filter accordingly. When the pressure conditions change so that the flow path leads from the first port to the second port, the dirt particles are removed again and conducted in the direction of the preliminary stage. Since however the preliminary stage usually has a small stroke and a small flow opening, larger dirt particles may cause seizing or clogging of the preliminary stage, which can lead to a function loss of the valve.

SUMMARY

The valve according to the disclosure has the advantage that filtration of the fluid is guaranteed in a simple manner, and in particular seizing and/or clogging of the preliminary stage is prevented, wherein the provision of additional (filter) elements may be omitted. The valve according to the disclosure is distinguished in that a filtration gap is formed in a flow path from the first port to the preliminary stage by a constriction of the flow path. It is thus provided that a filtration gap is formed in the flow path from the first port, to which the filter is assigned, to the preliminary stage. The filtration gap is formed by a constriction of the flow path, wherein the size of the filtration gap may be set on production of the valve. All the hydraulic medium supplied from the first port to the preliminary stage passes through the filtration gap, so accordingly the hydraulic medium is filtered on its way to the preliminary stage. Suitably, the size of the filtration gap is selected so as to filter out the larger dirt particles which are also retained by a filter preferably assigned to the first port. In this way it is possible easily to protect the preliminary stage from seizing and/or clogging, in particular without the need to install an additional filtration element in the flow path. Preferably, the first closing body and the second closing body are arranged axially displaceably.

According to an advantageous refinement of the disclosure, it is provided that the second closing body is arranged axially displaceably in regions in a valve sleeve, wherein the first valve seat lies inside the valve sleeve, and wherein the flow path leads through at least one radial opening into the valve sleeve. The hydraulic medium thus passes through the radial opening into the interior of the valve sleeve in which the first valve seat and hence the preliminary stage are located. According to an embodiment of the disclosure, it is preferably provided that the radial opening is configured as a slot in order to form the filtration gap. In this way, the dirt particles are already, on the outside of the valve sleeve, prevented from reaching the preliminary stage. Preferably, a plurality of radial openings is provided which each form a filtration gap.

According to a preferred refinement of the disclosure, it is provided that at least one radial opening is formed axially at the level of an actuating element protruding into the valve sleeve and assigned to the first closing body, wherein the filtration gap as described above is formed by the radial opening, or preferably is formed radially between the actuating element and the valve sleeve. For this, the outer diameter of the actuating element and the inner diameter of the valve sleeve are selected accordingly, such that the filtration gap is formed in at least one axial portion. Preferably, the filtration gap extends over the entire periphery of the actuating element or valve sleeve. Alternatively, it may be provided that the filtration gap extends over one or more peripheral segments between the actuating element and the valve sleeve. Preferably, the actuating element is configured as a solenoid armature which is displaced, in particular axially, on powering of a stationary magnetic coil of the valve, in order to press the first closing body, in particular against a spring force, against the first valve seat or to release this therefrom. According to a preferred embodiment of the disclosure, the actuating element and the closing body are formed integrally with each other.

According to a preferred refinement of the disclosure, it is provided that the radial opening is formed as a through bore in a casing wall of the valve sleeve. As described above, the through bore may also be formed as a slot in order to form the or a further filtration gap. When formed as a through bore, the radial opening may be provided at any arbitrary axial height in the valve sleeve.

According to an alternative embodiment of the disclosure, it is provided that the radial opening is formed preferably between the actuating element and a face of the valve sleeve assigned to the actuating element. In this way, no through bores need be provided in the casing wall of the valve sleeve. The flow path then leads from the first port into the interior of the valve sleeve via the face-side radial opening formed axially between the actuating element and the valve sleeve, wherein on the path to the preliminary stage, the flow path is constricted by the filtration gap as described above.

Preferably, for this the actuating element has at least one axial groove on its outer casing surface facing the valve sleeve, which forms a portion of the flow path. The radial opening is fluidically connected to the axial groove so that the hydraulic medium passes from the radial opening into the axial groove. The end of the axial groove opposite the radial opening is preferably constricted by the filtration gap.

According to an advantageous refinement of the disclosure, it is provided that the at least one radial opening is arranged axially at the level of the second closing body, wherein the at least one filtration gap is formed radially between the second closing body and the valve sleeve. In this case too, the filtration gap—as described above—is defined by the choice of diameter, in particular of the closing body and valve sleeve. Suitably, here again the filtration gap may extend over the entire periphery of the second closing body, or comprise one or more peripheral segments.

Preferably, it is provided that the filtration gap here lies adjacent to an axial air gap between the actuating element and the second closing body. Thus, as viewed in the flow direction, the filtration gap lies directly in front of the space in which the preliminary stage is formed. The hydraulic medium is thus securely filtered before introduction to the preliminary stage, and the large dirt particles are retained.

According to a further advantageous refinement of the disclosure, it is provided that the second closing element is guided with a cylinder portion through an opening of the valve sleeve in a face of the valve sleeve facing away from the actuating element, wherein the filtration gap is formed between the opening and the cylinder portion. In this way, the hydraulic medium enters the region of the first preliminary stage through the filtration gap between the opening of the valve sleeve and the cylinder portion of the actuating element. Additional radial openings in the filtration sleeve are here preferably omitted, so that the hydraulic medium reaches the preliminary stage only through the filtration gap. Preferably, here again the filtration gap extends over the entire periphery of the cylinder portion of the actuating element. Alternatively, it is provided that the filtration gap extends over a plurality of peripheral segments of the cylinder portion. In this way it is guaranteed in particular that regions remain in which the cylinder portion is guided in a radially defined manner in the opening of the valve sleeve, so that for example tilting of the second closing element in the valve sleeve is avoided.

Furthermore, it is preferably provided that a flow deflection, in particular by 90°, is provided upstream of the filtration gap as viewed in the flow direction of the flow path. This flow deflection causes larger dirt particles to be expelled/ejected from the hydraulic medium, and so the flow deflection constitutes an additional obstacle for the inflowing dirt particles.

Preferably, alternatively or additionally, a groove, in particular an annular groove, is located upstream of the filtration gap in the flow direction and assumes several functions. Firstly, it homogenizes the hydraulic medium which may be entering from one or more radial openings and distributes it over the filtration gap, and secondly it serves to receive the retained dirt particles.

BRIEF DESCRIPTION OF THE DRAWINGS

The disclosure is now explained in more detail with reference to several exemplary embodiments. The drawings show.

DETAILED DESCRIPTION

Figure 1:
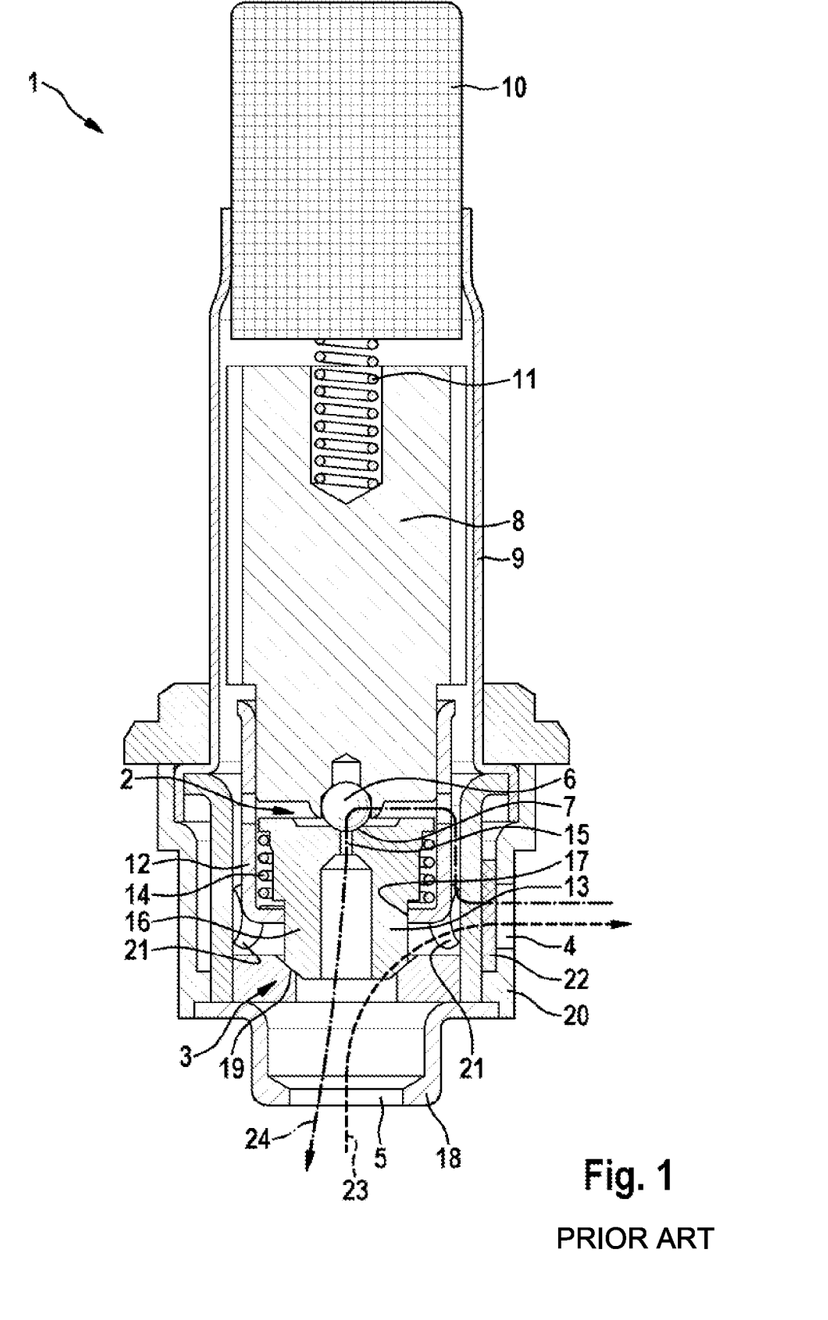
FIG. 1 a two-stage solenoid valve from the prior art in a longitudinal section view, FIG. 2 a first exemplary embodiment of an advantageous valve in a longitudinal section view, FIG. 3 a detail view of the first exemplary embodiment, FIG. 4 a second exemplary embodiment of the valve in a longitudinal section view, FIG. 5 the second exemplary embodiment in a cross section view, FIG. 6 a third exemplary embodiment of the valve in a longitudinal section view, FIG. 7 a fourth exemplary embodiment of the valve in a longitudinal section view, and FIG. 8 a fifth exemplary embodiment of the valve in a longitudinal section view.

FIG. 1 shows, in a simplified longitudinal section view, a two-stage valve 1 which is formed as a high-pressure switching valve for a brake system of a motor vehicle. The valve 1 has a preliminary stage 2 and a main stage 3, wherein the preliminary stage 2 and the main stage 3 are both arranged between a first port 4 and a second port 5 of the valve 1. The port 4 serves to connect the valve 1 to a primary circuit of a brake system, such as for example a master brake cylinder, and the second port 5 serves to connect it to a secondary circuit, such as for example a pump device.

The preliminary stage 2 is formed by a first closing body 6, in this case formed as a valve ball, and a first valve seat 7. The valve body 6 is fixedly connected to an actuating element 8 which is displaceable axially in a first valve sleeve 9.

To displace the actuating element 8, a pole piece 10 is arranged axially spaced therefrom in the valve sleeve 9, to which piece a magnetic coil (not shown here) is assigned. When the magnetic coil is powered, a magnetic field is generated by means of the pole piece 10 which draws the actuating element 8—which is formed as an armature accordingly—in the direction of the pole piece 10. A compression spring 11, in this case in the form of a coil spring, is arranged pre-tensioned between the pole piece 10 and the actuating element 8, against which spring the actuating element is drawn for actuating the valve 1. To this extent, the valve 1 constitutes a normally closed solenoid valve. In the unactuated state, the coil spring 11 presses the first closing body 6 against the first valve seat 7 by means of the actuating element 8. The actuating element 8 here protrudes axially in regions into a second valve sleeve 12, in which the preliminary stage 2 or the first valve seat 7 lies.

The first valve seat 7 is formed by a second closing body 13 which is arranged axially displaceably in the second valve sleeve 12. A further compression spring 14, in this case in the form of a coil spring, is provided in the second closing body 13 and presses the second closing body 13 in the direction of the actuating element 8. The second closing body 13 has a passage opening 15 which is assigned to the first valve seat 7. The first closing body 6 thus closes the passage opening 15 when the solenoid valve 1 is in the unactuated state.

The second closing body 13 has an axial portion 16 which protrudes through a face-side opening 17 of the valve sleeve 12. The valve 1 furthermore has a third valve sleeve 18 which is formed in multiple stages, in particular in the manner of a deep-drawn component. The valve sleeve 12 and the axial portion 16 protrude into the third valve sleeve 18, wherein the third valve sleeve 18 forms a second valve seat 19 which cooperates with the closing body 13 to form the main stage 3. The valve sleeve 18 has the port 5 at its free end. The valve sleeve 18 is here arranged in a valve housing 20 which radially comprises the port 4. The valve sleeve 18 has a plurality of radial openings 21 arranged distributed over the periphery of the valve sleeve 13 and lying axially at the level of the port 4.

A filter 22 is also assigned to the port 4 and is configured to retain large dirt particles.

If the pressure in the secondary circuit is greater than in the primary circuit, the hydraulic medium lifts the closing body 13 from the second valve seat 19 and thus flows to the port 4 through the filter 22, as indicated by an arrow 23, wherein any large dirt particles are retained in the filter 22. If the valve 1 is actuated in that the first closing body 6 is drawn away from the first valve seat 7 by means of the actuating element 8, hydraulic medium flows from the primary circuit into the secondary circuit, as indicated by an arrow 24. The dirt particles thus removed again from the filter 22 can lead to blockage of the preliminary stage 2.

Figure 2:
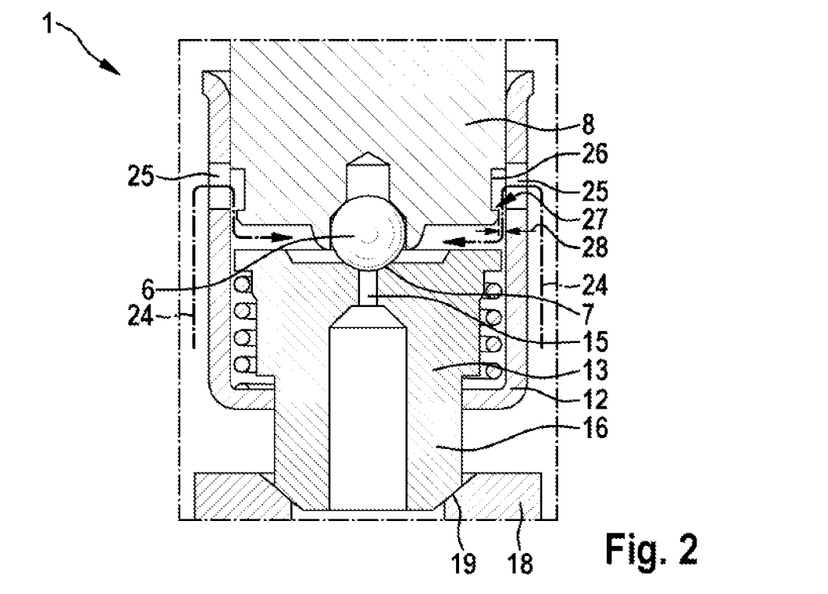

FIG. 2 shows a first exemplary embodiment of an advantageous refinement of the valve 1 which securely prevents seizing or clogging of the preliminary stage 2. For this, FIG. 2 shows a detail of the valve 1 in an enlarged longitudinal section view.

At the level of the actuating element 8, a plurality of radial openings 25 is arranged in the valve sleeve 12, distributed over the periphery of the valve sleeve 12. The hydraulic medium flows through these radial openings 25 from the port 4 into the valve sleeve 12. At its end assigned to the closing bodies 6, 13, the actuating element 8 has an annular groove 26 in its outer casing surface which extends over the entire periphery of the actuating element 8. In at least one actuating position of the actuating element 8, in particular the rest position as shown, the annular groove 26 is located in the region of the radial opening. The annular groove 26 forms a flow deflection 27, as shown in an enlarged view in FIG. 3. Preferably, the annular groove 26 is configured such that it has vertical side walls to ensure a flow deflection by 90°.

In the flow direction shown by arrow 24, the annular groove 26 is followed by a constriction of the flow path. The outer diameter of the actuating element 8 relative to the inner diameter of the valve sleeve 12 is here selected such that a narrow filtration gap 28 is formed radially between the actuating element 8 and the valve sleeve 12. Preferably, the filtration gap 28 is dimensioned such that it has a filtration effect similar to or the same as that of the filter 22, in order also to prevent large dirt particles, which become detached from the filter 22 and are flushed back, from passing in the direction of the preliminary stage 2. The filtration gap 28 here extends over the entire periphery of the actuating element 8 and is thus configured as an annular filtration gap. The annular groove 26 upstream of the filtration gap 28 leads firstly to dirt particles being expelled from the hydraulic medium by the flow deflection before reaching the filtration gap 28, and secondly in particular to dirt particles retained by the filtration gap 28 being collected in the annular groove 26 without clogging the filtration gap 28.

Due to the advantageous configuration, the dirt particles retained by the filter 22 are therefore prevented from reaching the preliminary stage 2 and there for example becoming seized between the first closing body 6 and the first valve seat 7, which would lead to malfunction of the valve 1.

According to this exemplary embodiment, the second closing body 13 is arranged preferably radially tightly on the valve body 12.

Figure 4:
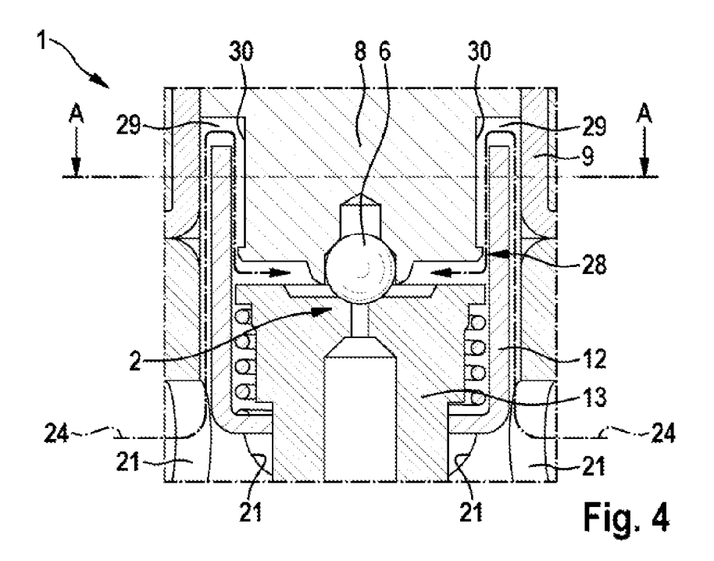

FIG. 4 shows a second exemplary embodiment of the valve 1 in a longitudinal section view. In the exemplary embodiments described below, essentially only differences from preceding exemplary embodiments are discussed, and to this extent the same elements carry the same reference numerals and in this respect reference is made to the description above.

Figure 3:
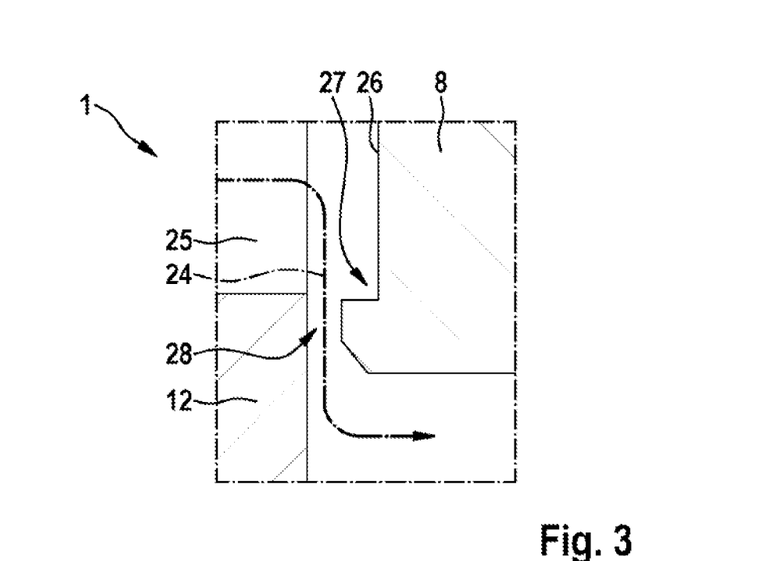

The second exemplary embodiment according to FIG. 4 differs from the first exemplary embodiment according to FIGS. 2 and 3 in that the radial openings 25 are not formed as radial bores, but as recesses 29 open at the edge on the face of the valve sleeve 12 facing the actuating element 8.

Figure 5:
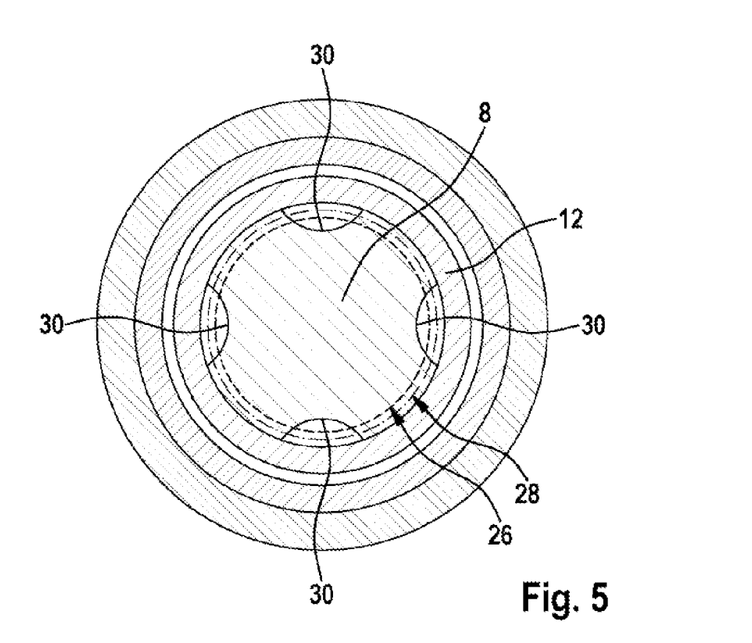

In this case, the actuating element 8 preferably has a plurality of axial grooves 30 arranged distributed over the periphery, which deflect the flow path 24 along the actuating element 8. The axial grooves 30 are in communicative connection with the recesses 29. The recesses 29 may be formed by an axial spacing of the valve sleeve 12 and the actuating element 8, which extends over the entire periphery of the valve sleeve 12. Both the annular groove 26 and the axial grooves 30 may have a square, round, curved or polygonal cross section. The respective filtration gap 28 may also be formed as peripheral segments, so that it extends not over the entire periphery but only over one or more peripheral segments. In this case, preferably several filtration gaps are provided, arranged distributed over the periphery. The axial grooves 30 (longitudinal grooves) may be formed by material removal or by cold-forming (cold beating). FIG. 5 for this shows a cross section through the valve 1 along line A-A of FIG. 4.

Figure 6:
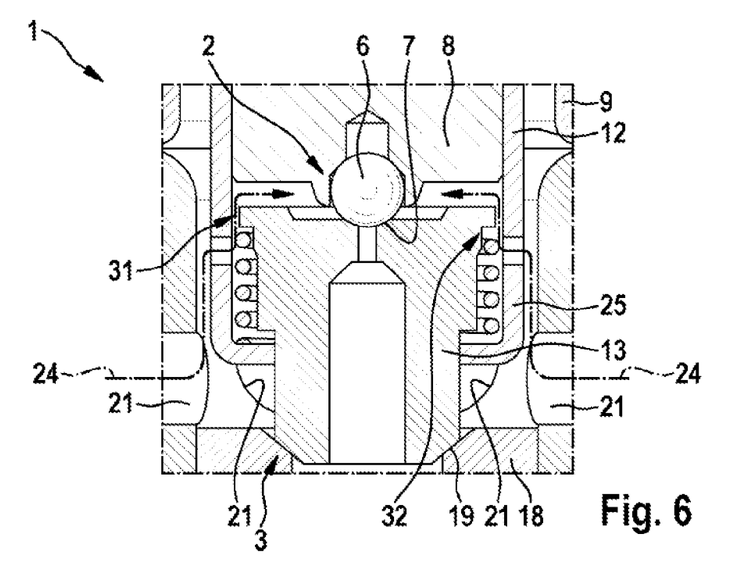

FIG. 6 shows a third exemplary embodiment of the valve 1 which differs from the preceding exemplary embodiments in that the radial openings 25 of the valve sleeve 12 are provided axially as radial bores/through bores at the level of the second closing body 13. In this way, the hydraulic medium enters the valve sleeve 12 in the region of the second closing body 13. In this case, the end of the closing body 13 facing the actuating element 8 has on its outer periphery a diameter which is smaller than the diameter of the valve sleeve 12, so that a filtration gap 31 is formed between the flow body 13 and the valve sleeve 12, the form and function of which correspond to that of the filtration gap 28. Large dirt particles can also be retained accordingly by the filtration gap 31, so they cannot enter the preliminary stage 2. Preferably, a flow deflection 32 corresponding to the flow deflection 27 is located upstream of the filtration gap 31 as viewed in the flow direction.

Figure 7:
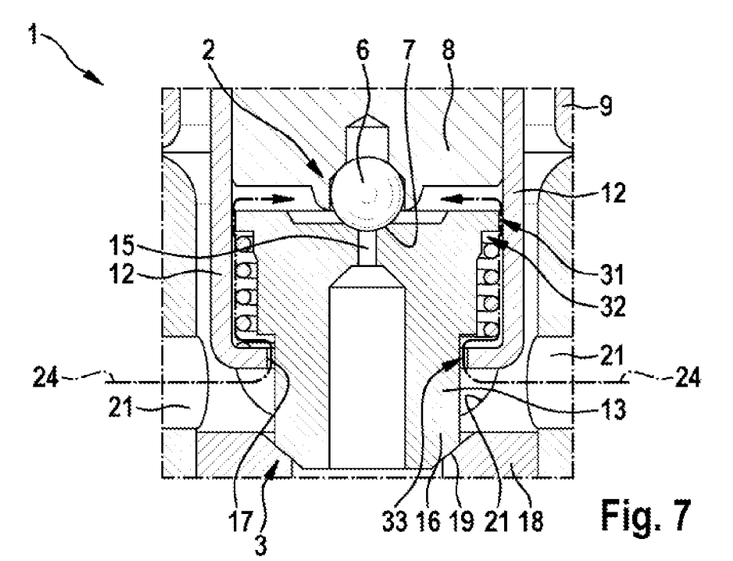

FIG. 7 shows a fourth exemplary embodiment of the valve 1 which differs from the exemplary embodiment in FIG. 6 in that there are no radial openings 25. Instead, the diameter of the opening 17 of the valve sleeve 12 and the outer diameter of the axial portion 16 of the closing body 13 are selected such that an annular opening 33 is formed, through which the hydraulic medium coming from the radial openings 21 can flow into the valve sleeve 12.

Figure 8:
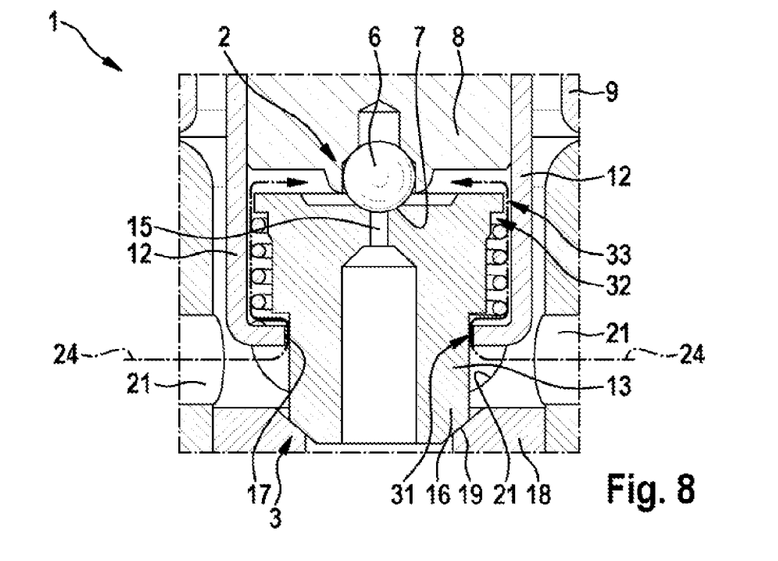

FIG. 8 shows a fifth exemplary embodiment of the valve 1 in a longitudinal section view, wherein this exemplary embodiment differs from the preceding exemplary embodiment in that the annular opening 33 and the filtration gap 31 are exchanged. For this, the outer diameter of the axial portion 16 of the closing body 13 and the inner diameter of the opening 17 of the valve sleeve 12 are selected such that the filtration gap 31 is formed between them. At the same time, the end of the closing body 13 facing the actuating element 8 is formed on its outer periphery such that the annular opening 33 is formed between the end and the valve sleeve 12. The annular opening 33 differs from the filtration gap 31 in that the constriction it forms in the flow path is lesser, and in particular a lower back-pressure is built up in operation, and dirt particles are not filtered at this point. Evidently, it would however also be conceivable to form the annular opening 33 as a filtration gap, in order to increase the overall filtration effect. It is also conceivable to provide the valve 1 with more than just the two valve stages shown and depicted here. Equally, it is conceivable to arrange the first and/or the second closing body not axially, but for example radially, displaceably and/or twistably.

The invention claimed is:

1. A valve for controlling fluids, comprising:
   a first port and a second port;
   a preliminary stage with a first valve seat and a first displaceable closing body;
   a main stage with a second valve seat and a second displaceable closing body; and
   an actuating element arranged axially displaceably in a valve sleeve and configured to selectively engage with the first closing body, wherein:
   the second closing body is arranged axially displaceably in the valve sleeve,
   the second closing body has a passage opening and the first valve seat is assigned to the passage opening,
   a filtration gap is formed in a flow path from the first port to the preliminary stage by a constriction of the flow path,
   the actuating element has at least one groove formed in a radially outwardly facing surface of the actuating element, and
   the at least one groove forms a portion of the flow path and is upstream of the filtration gap.

2. The valve as claimed in claim 1, wherein:
   the first valve seat lies inside the valve sleeve, and
   the flow path leads through at least one radial opening formed in the valve sleeve.

3. The valve as claimed in claim 1, wherein:
   the at least one groove is an axial groove, and
   the flow path leads through at least one radial opening formed axially at the level of the actuating element.

4. The valve as claimed in claim 1, wherein:
   the filtration gap is formed radially between the actuating element and the valve sleeve.

5. The valve as claimed in claim 1, wherein the filtration gap lies adjacent to an axial air gap between the actuating element and the second closing body.

6. The valve as claimed in claim 4, wherein the filtration gap lies adjacent to an axial air gap between the actuating element and the second closing body.

7. The valve as claimed in claim 1, wherein the at least one groove is an annular groove.

* * * * *